United States Patent [19]

Brems

[11] Patent Number: 4,588,338

[45] Date of Patent: May 13, 1986

[54] FOLLOWER MECHANISM AND CONTROL FOR ROTARY METAL REMOVING TOOLS

[76] Inventor: John H. Brems, Apt. 11-G, 2800 S. Ocean Blvd., Boca Raton, Fla. 33432

[21] Appl. No.: 585,186

[22] Filed: Mar. 1, 1984

[51] Int. Cl.[4] .................................................. B23C 1/16
[52] U.S. Cl. ..................................... 409/124; 409/97; 409/110; 409/125; 74/68
[58] Field of Search ................... 409/85, 92, 110, 123, 409/124, 125, 130, 97, 94, 126, 112, 113, 116; 74/53, 55, 63, 68

[56] References Cited

U.S. PATENT DOCUMENTS

| | | | |
|---|---|---|---|
| 2,389,709 | 11/1945 | Anders | 74/55 |
| 2,494,532 | 1/1950 | Ager | 409/125 |
| 2,700,534 | 1/1955 | Pegues | 74/55 |
| 2,723,598 | 11/1955 | Mann | 409/97 |
| 2,915,911 | 12/1959 | Hebeler et al. | 74/63 |
| 3,368,414 | 2/1968 | Scholin et al. | 74/68 |
| 4,202,221 | 5/1980 | Thompson | 74/827 |

FOREIGN PATENT DOCUMENTS 132443 8/1983 Japan ....................................... 409/85

*Primary Examiner*—Gil Weidenfeld
*Assistant Examiner*—Daniel W. Howell
*Attorney, Agent, or Firm*—Barnes, Kisselle, Raisch, Choate, Whittemore & Hulbert

[57] ABSTRACT

A mechanism and control for mechanically moving a rotary metal removing tool such as a milling cutter or grinder in a path determined by a regular or irregular contour of a work part. The control is such that the tool may move at a constant feed rate or at a variable rate, for example, more slowly, in areas where a heavier cut is necessary. A contour cam controls the tool position and a second cam controls the feed rate in either a constant or variable velocity as determined by the workpiece.

5 Claims, 14 Drawing Figures

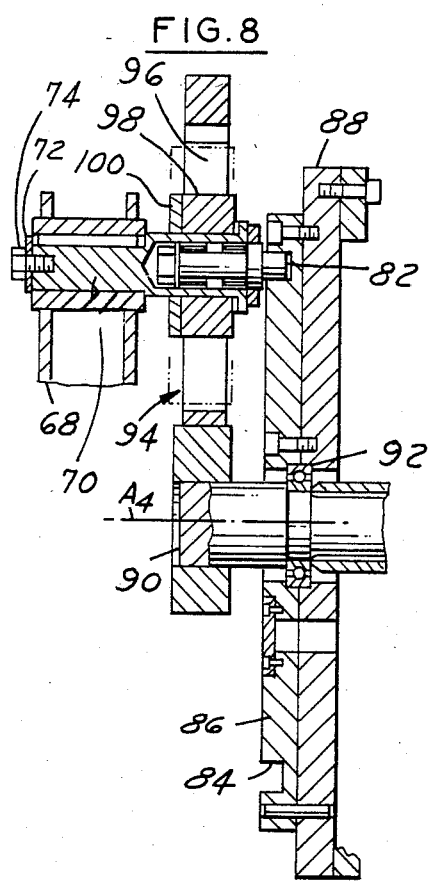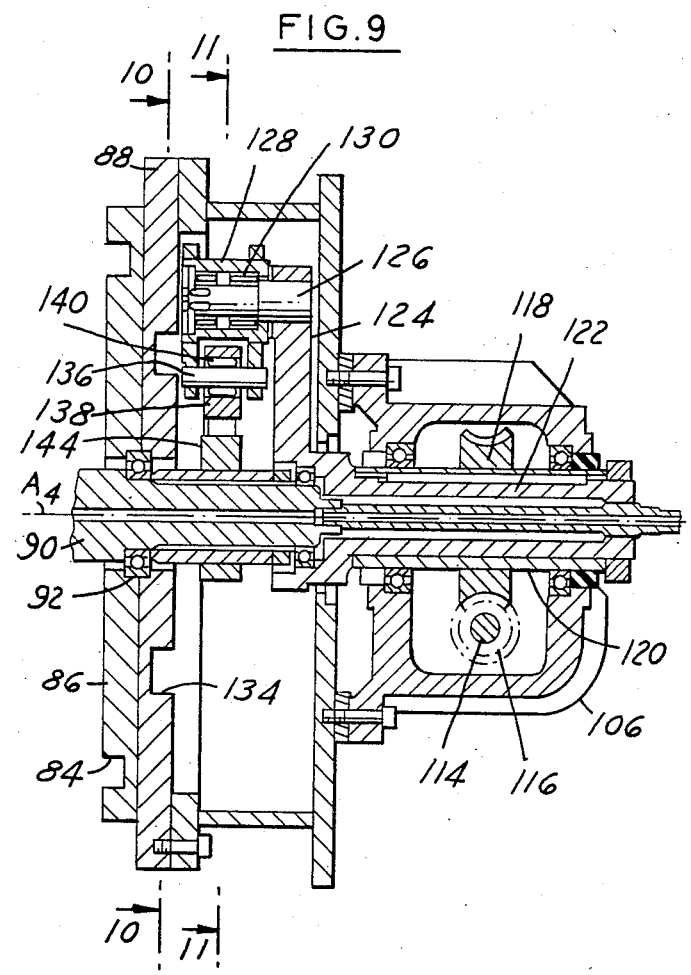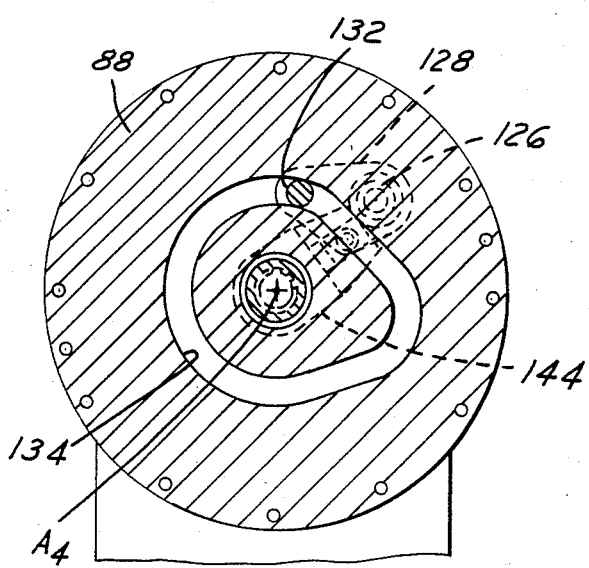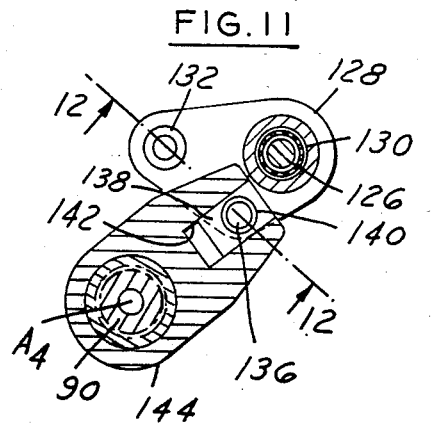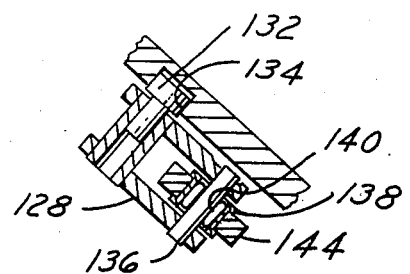

FOLLOWER MECHANISM AND CONTROL FOR ROTARY METAL REMOVING TOOLS

FIELD OF INVENTION

Mechanisms and controls for moving a rotary metal removing tool, such as a cutter or grinder in a predetermined path which may be a regular or irregular contour.

BACKGROUND OF THE INVENTION

In the field of high production transfer machines, a need occasionally arises in which it is necessary to move a milling cutter or other comparable cutting or metal removing tool around a predetermined path on a workpiece. In such applications, reliability and simplicity are of greater importance than flexibility in modifying the contour path.

It is one object of this invention to provide a relatively simple, fully mechanical, system for causing a milling cutter or comparable cutting tool to follow a predetermined contour path.

In some applications, it is desired that the cutting tool move along the contour path at a substantially constant feed rate or constant velocity. In other applications, it is desired that the cutting tool move at a variable rate, as, for example, a slower rate in areas where more material is to be removed.

It is another object of this invention to provide a mechanical system in which a cam controls the feed rate, or velocity of the cutter along the contour path, and in which that cam can be designed to provide a constant feed rate or any other reasonable predetermined feed rate.

Other objects and features of the invention will be apparent in the following description, accompanying drawings, and claims in which the invention is described together with details to enable persons skilled in the art to practice the invention, all in connection with the best mode presently contemplated for the invention.

BRIEF DESCRIPTION OF THE DRAWINGS

DRAWINGS accompany the disclosure and the various views thereof may be briefly described as:

FIG. 8, a section taken on line 8—8 of FIG. 6;
FIG. 9, a section taken on line 9—9 of FIG. 6;
FIG. 10, a section taken on line 10—10 of FIG. 9;
FIG. 11, a section taken on line 11—11 of FIG. 9;
FIG. 12, a section taken on line 12—12 of FIG. 11.

Referring to FIGS. 1 and 2, a wingbase 20 supports a slidebase 22 on which is slideably mounted a slide carriage 24. The wingbase 20 is bolted to a centerbase 26 on which is supported a pallet registry 28 which locates and clamps a pallet 30. A workpiece 32 is located and clamped on the pallet 30. It will be understood that the elements 20–30 are representative components of a single station of a multi-station transfer machine, and further, that the slide carriage 24 is movable on the slide base 22 to the right (advance) or to the left (return) as driven by a conventional hydraulic or electromechanical system.

Figure 2:
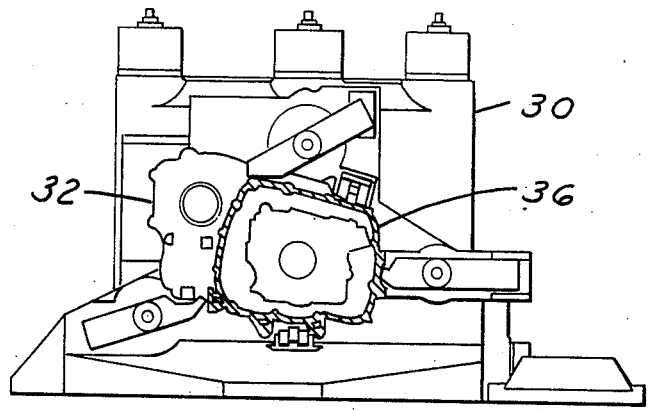
FIG. 2, a section taken on line 2—2 of FIG. 1.
Figure 3:
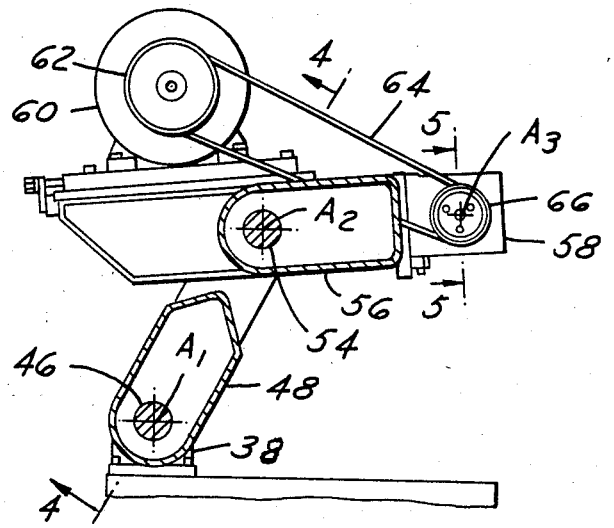
FIG. 3, a section taken on line 3—3 of FIG. 1.
Figure 4:
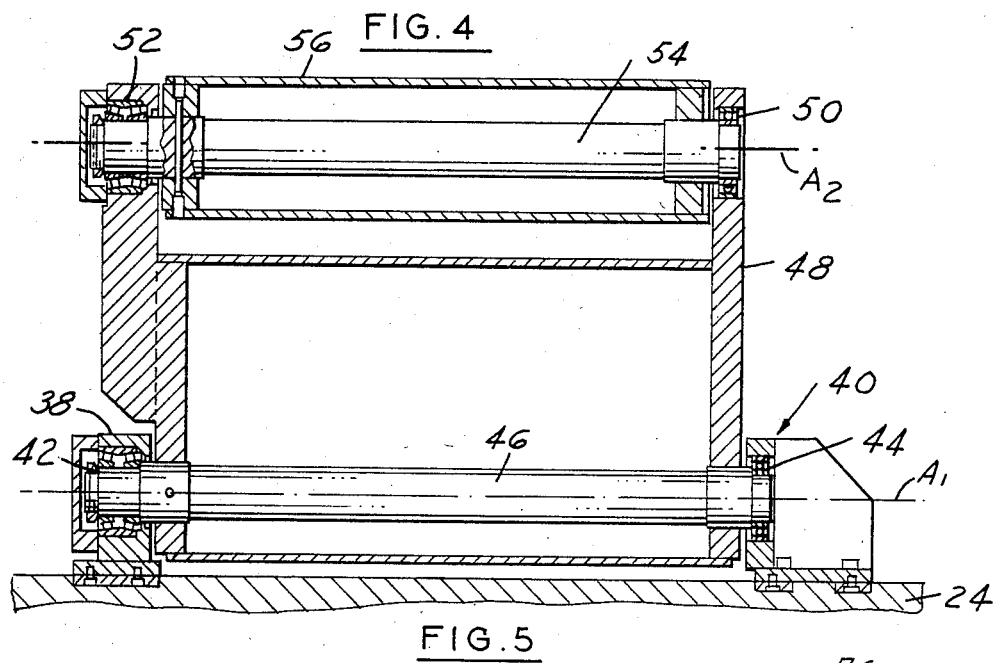
FIG. 4, a section taken on line 4—4 of FIG. 3.

The tooling system which comprises this invention is mounted on the slide carriage 24 and terminates in a milling cutter 34 which mills the face 36 of the workpiece 32, FIG. 2. The workpiece face 36 is crosshatched in FIG. 2 for definition, and it will be noted this contour is significantly non-circular.

Referring to FIGS. 1, 3, 4 and 5, a forward bearing block 38 and a rear bearing block 40 house bearings 42 and 44 respectively; a shaft 46 on axis $A_1$, which is parallel to the axis of movement of slide carriage 24, is supported by bearings 42 and 44 and in turn supports a link 48 which, through its mounting, is free to oscillate about a generally vertical attitude. Two bearings 50 and 52 are mounted in the upper end of the link 48; these bearings support a shaft 54 on an axis $A_2$, parallel to axis $A_1$ on which in turn is mounted a link 56. This link 56 is free to oscillate about axis $A_2$ about a generally horizontal attitude. A conventional milling spindle assembly 58 is mounted on the outboard face of the link 56, and on it is mounted the aforesaid milling cutter 34. The axis of the milling spindle 58 and milling cutter 34 is designated as $A_3$, which is parallel to axes $A_1$ and $A_2$. A motor 60 is also mounted on the link 56 and drives the spindle through pulley 62, belt 64 and pulley 66.

Figure 1:
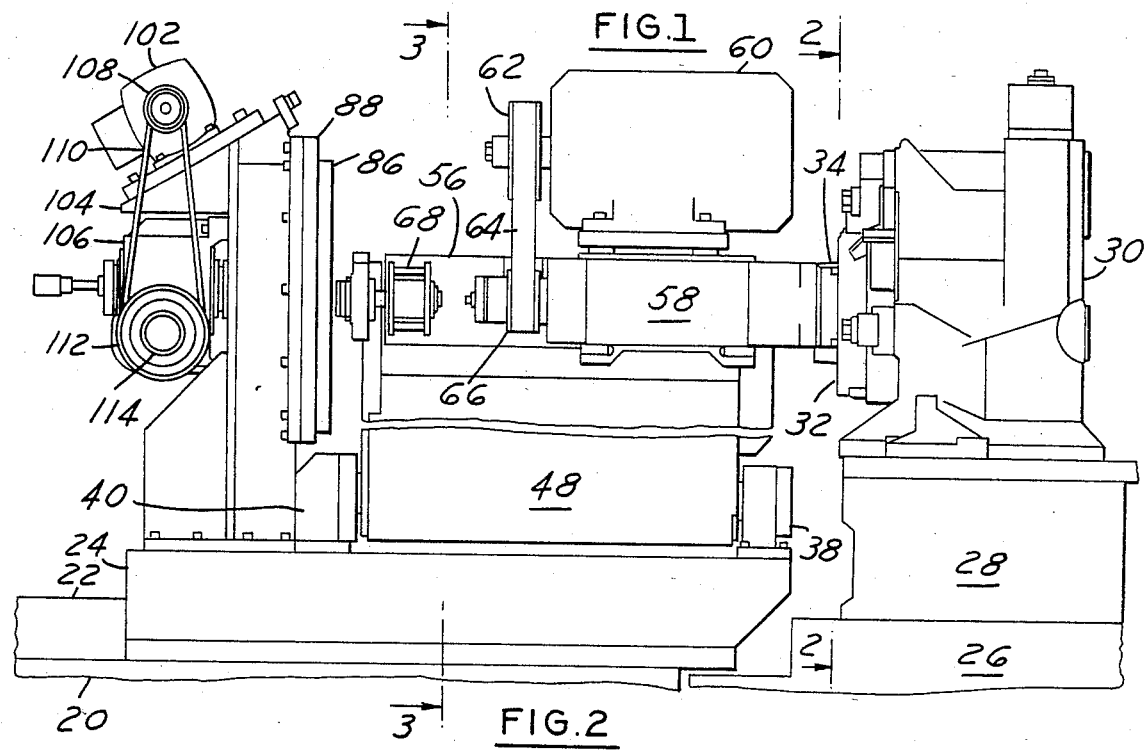
FIG. 1, a side elevation of the system which comprises this invention.
Figure 5:
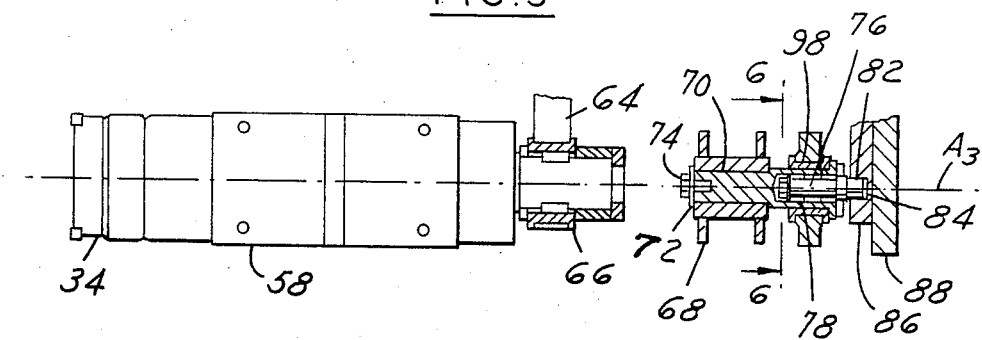
FIG. 5, a section taken on line 5—5 of FIG. 3.
Figure 6:
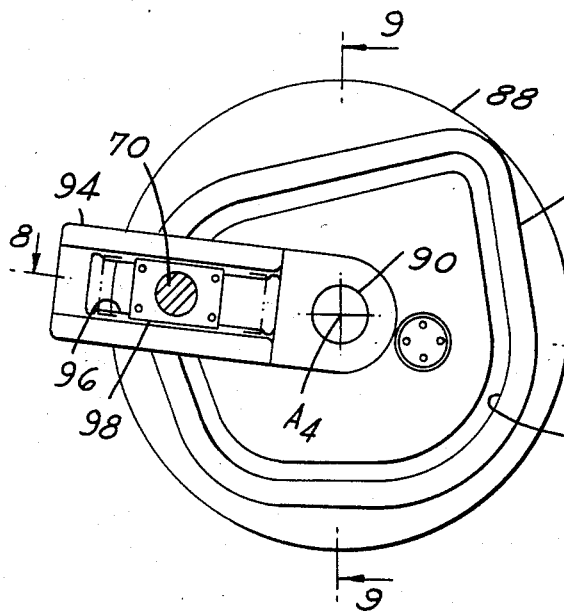
FIG. 6, a section taken on line 6—6 of FIG. 5.

Referring to FIGS. 1, 5 and 6, a bracket 68 is mounted on the link 56; a circular adapter 70 is piloted into the bracket 68 and retained by a washer 72 and bolt 74. A cam follower shaft 76 is journalled in the adapter 70 through bearings 78 and 80 with the centerline of the cam follower shaft 76 coincident with the axis $A_3$. The cantilevered end 82 of the shaft 76 is closely fitted into a groove 84 of a plate cam 86 mounted on a housing 88 in turn directly mounted on the slide carriage 24. The contour of the groove 84 is the exact duplicate of the path desired to be followed by the centerline of the milling cutter 34.

It will be noted that link 48 is very rigid, whereby axis $A_2$ is maintained parallel to axis $A_1$ independent of the angular position of link 48. Similarly, link 56 is also very rigid, whereby axis $A_3$ is maintained parallel to axis $A_2$ independent of the angular position of link 56; therefore, axis $A_3$ is always parallel to axis $A_1$. Accordingly, if any point on axis $A_3$ is guided along a predetermined path in a plane perpendicular to axes $A_1$, $A_2$ and $A_3$, then, any other point on axis $A_3$ follows that same path in another plane also perpendicular to axes $A_1$, $A_2$ and $A_3$. In this instance, the end 82 of the shaft 76 on axis $A_3$ is guided by the groove 84 in cam 86 and the centerline of the milling cutter 34, also on axis $A_3$, will follow the same path in its own plane of travel.

Figure 7:
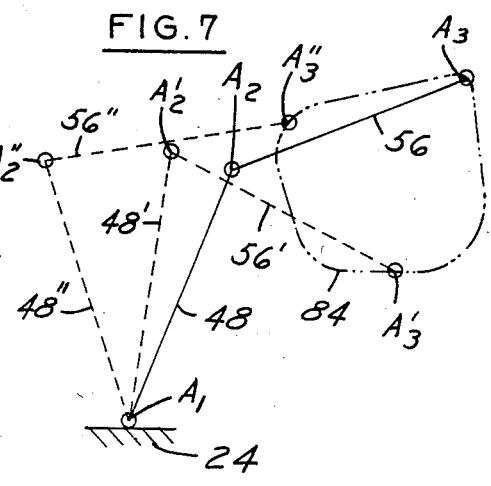
FIG. 7, a schematic line drawing showing the linkage positions at three points while traversing the contour.

Temporarily omitting the means of moving the axis $A_3$ about the predetermined path of cam groove 84, the schematic behavior of the links 48 and 56 and axes $A_1$, $A_2$ and $A_3$ may be visualized through the aid of FIG. 7. In this figure, the links 48 and 56 are schematically represented by the lines (or planes in three dimensions) connecting axes $A_1$ and $A_2$ and the axes $A_2$ and $A_3$ respectively; and the contour of the cam groove 84 is shown by its centerline only. The links 48 and 56 are shown in three arbitrary positions which are designated as follows: in the initial or starting position, the elements are shown without superscript; in a second position, approximately one third away around the contour, the elements are noted with a prime; and in a third position, approximately two thirds of the way around the contour, the elements are noted with a double prime. The means for guiding the milling cutter around the predesignated path has been described above; the means for powering it along that path will now be described.

Referring to FIGS. 1, 6, 8 and 9, a drive shaft 90 is journalled in the housing 88 through a bearing 92; the shaft 90 rotates about a fixed axis $A_4$ within the contour of the cam groove 84. On the outboard end of the shaft 90 is mounted a drive arm 94 in which is incorporated a slot 96. A slide block 98 is closely fitted into the slot 96 and held in place with a retainer 100. The slide block 98 in turn is journalled on the outside diameter of adapter 70. It can be seen that as the drive shaft 90 is rotated about axis $A_4$, as will be described, the adapter 70, and the cam follower shaft 76 concentrically mounted therein, are driven along the path determined by the cam groove 84. Since the distance from the axis $A_4$ to the cam groove 84 varies, it is clear that the slide block 98 will slide in the slot 96 of the drive arm 94. To minimize the amount of sliding stroke required, the position of axis $A_4$ is arbitrarily chosen as the approximate "center of gravity" of the cam groove contour.

If the contour were a true circle and axis $A_4$ were the center of that circle, no movement of the slide block 98 in the slot 96 would be required. Furthermore, a constant angular velocity of the drive shaft 90 would create a constant feed velocity of the milling cutter along the contour path. Since the contour path is not a true circle, a constant angular velocity of the drive shaft 90 will create a variable feed velocity of the milling cutter along the contour path which is undesirable. To create a constant feed velocity of the milling cutter along the contour path requires a variable angular velocity of the drive shaft 90 utilizing a speed varying mechanism and design technique which will now be described.

Referring to FIGS. 1, 9, 10, 11 and 12, a motor 102 is mounted on a supporting bracket 104 which is part of the housing 88. This motor 102 drives a flange mounted worm gear reducer 106, mounted on the housing 88, through pulley 108, belt 110, and pulley 112 on the worm gear shaft 114 of the gear reducer 106. The shaft 114 mounts a worm gear 116 which drives a worm wheel 118 carried on a tubular shaft 120. A crank shaft 122 is keyed to the tubular shaft 120; the forward end of the crankshaft 122 is formed into a cheek plate 124 which, in turn, carries a crankpin 126. A bellcrank lever 128 is pivoted on the crankpin 126 through bearings 130. On one corner of this bellcrank lever 128 a cam follower roller 132 is mounted. This roller 132 is closely fitted into a cam groove 134 which is cut into the inside face of one inner face of the housing 88. The other corner of the bellcrank lever 128 carries a drive pin 136 on which is journalled a slide block 138 through a bearing 140. The slide block 138 is closely fitted in a slot 142 of a drive lever 144 splined on the drive shaft 90, which is coaxial with the crankshaft 122. The drive shaft 90 is journalled into the crank end of crankshaft 122 to provide additional overhung-load capacity.

The motor 102, worm gear 116, and crankshaft 122 each rotate at substantially constant velocity during a given cycle. If the cam groove 134 were a true circle concentric about axis $A_4$, then as crankshaft 122 rotates about axis $A_4$, there would be no relative motion of the bellcrank lever 128 about the crankpin 126 and the drive lever 144 would remain in a fixed relationship with respect to the cheek plate 124; i.e., drive lever 144 and cheek plate 124 would rotate in unison as would, therefore, drive shaft 90 and crankshaft 122.

If, however, there is a deviation in the cam groove 134 from a true circle about axis $A_4$, this deviation causes a relative rotation of the bellcrank lever 128 on crankpin 126 which in turn causes a relative angular displacement of the drive lever 144 with respect to the cheek plate 124. This may be qualitatively seen by referring to FIG. 10. It is assumed that crankpin 126 rotates clockwise with respect to axis $A_4$ as viewed in that figure. Now if the instantaneous radius of the cam groove 134 increases as the crankpin 126 moves clockwise, this causes a clockwise rotation of the bellcrank lever 128 about the crankpin 126; this in turn causes the drive pin 136 and slide block 138 to move the drive lever 144 counterclockwise with respect to the crankpin 126 on cheek plate 124. Therefore, an increasing radius of the cam groove 134 causes the drive shaft 90 to "fall behind" the crankshaft 122; similarly, a decreasing radius of the cam groove 134 causes the drive shaft to "gain" on the crankshaft.

This speed variation mechanism enclosed within the housing 88 and comprised of elements 120-144 is substantially the same as disclosed in my copending U.S. patent application, Ser. No. 449,241, filed Dec. 13, 1982, now continued into application Ser. No. 754,407, filed July 12, 1985, wherein it is addressed to other usage and in which its operation is explained in greater detail.

In this instance, its function is intended to provide a substantially constant velocity of the milling cutter along a contour line which approximates the centerline of the workface to be milled. This constancy of feed is not a system requirement. If, in some applications, certain portions of the milling path require a higher or lower feed rate, this too can be factored into the design of the cam groove 134.

Figure 13:
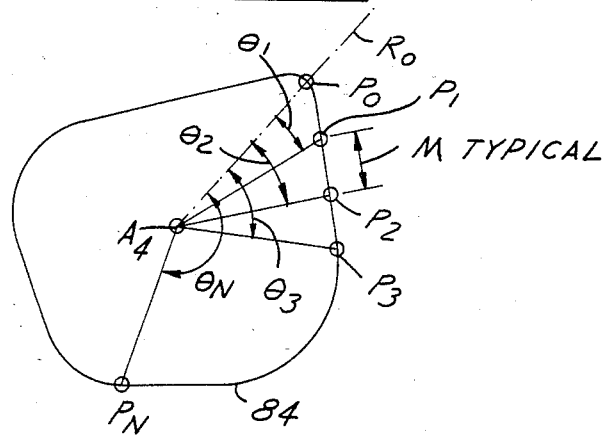
FIG. 13, a schematic scale layout defining the variables utilized for tabulating the differential angles.

The design technique for the cam groove 134 may be understood through reference to FIG. 13. The contour for the desired path of the centerline of the milling cutter is laid out; it will be noted that this is also the centerline of the cam groove 84. The length of the contour is calculated and designated as L. This length is then arbitrarily divided into N equal length segments with each segment having a length M. Therefore:

$$M = L/N$$

In the example of FIG. 13, N has been arbitrarily established as 20; whereas in actual cases N would usually be significantly larger. The segments, each having a length M, are then progressively laid out on the contour starting at an arbitrary starting point $P_0$; the dividing points between adjacent segments are labelled $P_1$, $P_2$, $P_3$, etc. progressively around the contour. The end of the last segment will be the starting point $P_0$. The centerline $A_4$ is then arbitrarily but knowledgeably chosen such that the radius variations from the point $A_4$ to the various points of the contour are as small as reasonably possible.

Radial lines are then constructed from the point $A_4$ to the contour at each point defining the intersection of two adjacent sections, i.e., the points $P_0$, $P_1$, $P_2$, etc. The line connecting the point $A_4$ to $P_0$ is designated $R_0$ which is defined as the master centerline The angles from this master centerline to the progressive radial lines are then measured and noted as $\theta_1$, $\theta_2$, $\theta_3$, etc. These are defined as the "equivalent angles".

It is clear that for the milling cutter to make a complete traverse of the contour, the crankshaft 122 and the drive shaft 90 must each make one revolution. If it assumed that the centerline of the milling cutter is to move at a constant feed rate around the contour, then the time required to move from point $P_0$ to point $P_1$ is identical to that required to move from point $P_1$ to point $P_2$, etc., since the distances between adjacent points are defined as equal. Since there are N (in this example, 20) equal segments, then it can be seen that the time required to traverse one segment is 1/N of the time required for a complete cycle. Furthermore, since the crankshaft 122 rotates at constant angular velocity, then this shaft will rotate 360/N degrees while the milling cutter traverses any given segment of length M. The angle of rotation of the crankshaft 122 is defined as the clock angle, with the 0 point that position of the crankshaft 122 where the centerline of the milling cutter is at point $P_0$ on the contour. With these definitions in mind, it is possible to construct a table in which the equivalent angle and the clock angle are tabulated against each other in Table I as follow:

| Point on Contour | Equivalent Angle | Clock Angle | Differential Angle |
|---|---|---|---|
| $P_o$ | 0 | 0 | 0 |
| $P_1$ | 16.1° | 18° | −1.9° |
| $P_2$ | 35.9° | 36° | −0.1° |
| $P_3$ | 55.2° | 54° | 1.2° |
| ′ | ′ | ′ | ′ |
| ′ | ′ | ′ | ′ |
| $P_o$ | 360° | 360° | 0 |

Figure 14:
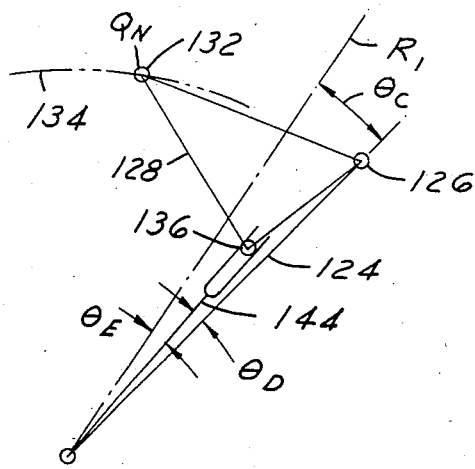
FIG. 14, a schematic line layout used in graphically generating the speed control cam.

It will be noted that at the end of a complete cycle, both the equivalent angle and the clock angle will reach 360 degrees. Furthermore, it can be seen that in the tabulation of Table I, that for very point $P_N$, reached by the centerline of the milling cutter, there exists a corresponding clock angle reached by the crankshaft 122; and since the position of the centerline of the milling cutter is equivalent to the position of the adapter 70, then it follows that the equivalent angle represents the angular position of the shaft 90, as measured from the radial line $R_0$. Stated another way, the clock angle represents the angular rotation of the crankshaft 122, while the equivalent angle represents the angular rotation of the drive shaft 90, as measured from their common starting point, for each designated point on the contour. Then at each point the clock angle is substracted from the equivalent angle and defined as the differential angle, and it is this differential angle which must be generated by the rotation of the bellcrank lever 128 on the crankpin. A graphical schematic drawing of this technique is shown in FIG. 14, in which the clock angle is represented as $\theta_C$, the equivalent angle as $\theta_E$, and the differential angle as $\theta_D$. In FIG. 14, the clock angle, $\theta_C$, and the equivalent angle, $\theta_E$, are each measured from a common starting centerline, $R_1$, which represents the position of the centerline of the cheek plate 124 when the centerline of the drive arm 94 is on the centerline $R_0$, FIG. 13. Centerlines $R_0$ and $R_1$ need not be coplanar nor must the centerlines of cheek plate 124 and drive arm 94. In FIG. 14, the elements concerned with the generation of the differential angle are schematically shown only. A given point on the centerline of the cam groove 134 is determined by this technique, and for every point $P_N$ on the contour, there will be constructed a corresponding point $Q_N$ on the cam groove 134. When all points, $Q_N$, have been determined as described, then they be interconnected by a smooth curve to generate the shape of the cam groove 134.

The foregoing represents a graphical method of determining the form of the cam groove 134. It is also possible to generate the form of this groove analytically by following the geometrical format of the graphical technique. This is very laborious to achieve using traditional computation techniques. However, through the use of programmable calculators or computers, this becomes practical and is preferred because of its greater precision.

The technique described above applies to situations in which the center of the milling cutter is to move at constant velocity along the predetermined contour. It is also possible to design the cam groove 134 such that the center of the milling cutter moves along the predetermined contour at a variable rate. Relative to the foregoing example, assume it is desired that the milling cutter should slow down to 75% of the otherwise constant rate while traversing the segment from $P_2$ to $P_3$. From Table I, the increment of clock angle required to traverse this segment at constant velocity is seen to be 18°, i.e., 36° to 54°. In order that this velocity be decreased to 75% of the otherwise constant velocity, it can be stated that the clock angle required to traverse this segment be increased by an inverse proportional amount, i.e., the clock angle increment for this increment be 18°/.75 or 24°. Therefore, the clock angle reached at $P_3$ will be 60°, rather than 54°. Furthermore, and assuming no other speed changes, the final clock angle would then be 366° due to the 6° incremental increase for the segment $P_2P_3$. This can then be corrected as follows. All of the tabulated clock angles must then be multiplied by the factor 360/366=0.9836 to achieve a "corrected clock angle," whose values relative to Table I would be 0, 17.7049°, 35.4098°, 59.0164°, etc. for points $P_0$, $P_1$, $P_2$, $P_3$, etc.

In summary, the incremental clock angle increase for any given segment for which the traverse speed is to be altered is divided by the speed factor desired for that segment. Next, a corrected clock angle is obtained by multiplying all clock angles by a correction factor defined as follows:

$$\text{Correction Factor} = \frac{360°}{\text{Sum of all clock angle increments}}$$

I claim:
1. In a contour machining operation in which it is desired to move a cutting tool along a predetermined planar path at a predetermined feed rate, a mechanical system comprising:
 (a) a frame,
 (b) movable support means mounted on said frame which supports:
 (c) a means for machining comprising a drive motor, a spindle driven by said drive motor, and a work processing tool member mounted on said spindle,
 (d) first cam means mounted on said frame,
 (e) guide means mounted on said movable support means, axially coincident with said spindle and cooperating with said first cam means to guide said tool member along said predetermined path, and

(f) mechanical drive means for driving said guide means along said predetermined path at a constant velocity.

2. In a contour machining operation in which it is desired to move a cutting tool along a predetermined planar path at a predetermined feed rate, a mechanical system comprising:
(a) a frame,
(b) movable support means mounted on said frame which supports:
(c) a means for machining comprising a drive motor, a spindle driven by said drive motor, and a work processing tool member mounted on said spindle,
(d) first cam means mounted on said frame,
(e) guide means mounted on said movable support means, axially coincident with said spindle and cooperating with said first cam means to guide said tool member along said predetermined path, and
(f) mechanical drive means for driving said guide means along said predetermined path at a controlled variable velocity such that the rate of volumetric metal removal is substantially constant.

3. In a contour machining operation in which it is desired to move a cutting tool along a predetermined planar path at a predetermined feed rate, a mechanical system comprising:
(a) a frame,
(b) movable support means mounted on said frame which supports:
(c) a means for machining comprising a drive motor, a spindle drive by said drive motor, and a work processing tool member mounted on said spindle,
(d) first cam means mounted on said frame,
(e) guide means mounted on said movable support means, axially coincident with said spindle and cooperating with said first cam means to guide said tool member along said predetermined path,
(f) mechanical drive means for driving said guide means along said predetermined path at a predetermined controlled velocity along said path,
(g) said movable support means comprising:
  (1) a first link member pivotally supported from said frame on a first axis parallel to the axis of said spindle,
  (2) a second link member pivotally supported from said first link member on a second axis parallel to said first axis,
(h) said mechanical drive means comprising:
  (1) a drive shaft mounting for rotation in said frame in a fourth axis substantially parallel to said first and second axes and lying within said predetermined path,
  (2) slot follower means mounted on said guide means,
  (3) a slotted drive arm member mounted on said drive shaft in driving engagement with said slot follower means, and
  (4) torque means connected to said drive shaft to rotate said drive shaft at a predetermined non-constant angular velocity, and (i) said torque means comprising:
  (1) an input shaft mounted for rotation in said frame on an axis substantially coincident with said fourth axis,
  (2) a crank member mounted on said input shaft,
  (3) a bellcrank member having two outboard corners and pivotally connected at a point between said corners to the outboard end of said crank member,
  (4) a cam follower member mounted on one corner of said bellcrank member,
  (5) second cam means mounted on said frame in operational engagement with said cam follower member,
  (6) drive arm means mounted on said drive shaft and in operational engagement with said other corner of said bellcrank member, and
  (7) power means on said frame for driving said input shaft at a substantially constant angular velocity.

4. A contour machining system as in claim 3 in which said drive arm means is slotted to receive a pin mounted on said bellcrank member.

5. In a contour machining operation in which it is desired to move a cutting tool along a predetermined planar path at a predetermined feed rate, a mechanical system comprising:
(a) a frame,
(b) movable support means mounted on said frame which supports:
(c) a means for machining comprising a drive motor, a spindle driven by said drive motor, and a work processing tool member mounted on said spindle,
(d) first cam means mounted on said frame,
(e) guide means mounted on said movable support means, axially coincident with said spindle and cooperating with said first can means to guide said tool member along said predetermined path, and
(f) mechanical drive means for driving said guide means along said predetermined path at a predetermined controlled velocity along said path,
(g) said movable support means comprising a first link member pivotally supported from said frame on a first axis parallel to the axis of said spindle, and a second link member pivotally supported from said first link member on a second axis parallel to said first axis, and
(h) said mechanical drive means comprising:
  (1) a drive shaft mounted for rotation in said frame on a fourth axis substantially parallel to said first and second axes and lying within said predetermined path,
  (2) slot follower means mounted on said guide means,
  (3) a slotted drive arm member mounted on said drive shaft in driving engagement with said slot follower means, and
  (4) torque means connected to said drive shaft to rotate said drive shaft at a predetermined non-constant angular velocity.

* * * * *

UNITED STATES PATENT AND TRADEMARK OFFICE
CERTIFICATE OF CORRECTION

PATENT NO. : 4,588,338
DATED : May 13, 1986
INVENTOR(S) : John H. Brems

It is certified that error appears in the above—identified patent and that said Letters Patent is hereby corrected as shown below:

Column 7, Line 50, change "mounting" to -- mounted --.

Signed and Sealed this

Fifth Day of August 1986

[SEAL]

Attest:

Attesting Officer

DONALD J. QUIGG

Commissioner of Patents and Trademarks